(12) United States Patent
Vaddagiri et al.

(10) Patent No.: US 12,393,606 B1
(45) Date of Patent: Aug. 19, 2025

(54) DATA MIGRATION USING A CONSISTENCY GROUP

(71) Applicant: HEWLETT PACKARD ENTERPRISE DEVELOPMENT LP, Spring, TX (US)

(72) Inventors: Murali Vaddagiri, Austin, TX (US); Krishna Karoor Kumar, San Jose, CA (US); Joseph Raymond Loos, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/751,594

(22) Filed: Jun. 24, 2024

(51) Int. Cl.
  *G06F 16/27* (2019.01)
  *G06F 16/21* (2019.01)
  *G06F 16/23* (2019.01)

(52) U.S. Cl.
  CPC ............ *G06F 16/27* (2019.01); *G06F 16/214* (2019.01); *G06F 16/2365* (2019.01)

(58) Field of Classification Search
  CPC ..... G06F 16/27; G06F 16/214; G06F 16/2365
  See application file for complete search history.

(56) References Cited

U.S. PATENT DOCUMENTS

| | | | |
|---|---|---|---|
| 7,542,987 B2 | 6/2009 | Lubbers et al. | |
| 7,904,748 B2 | 3/2011 | Witte et al. | |
| 8,015,270 B2 | 9/2011 | Malkin et al. | |
| 8,078,622 B2 | 12/2011 | Rabii et al. | |
| 8,935,206 B2 | 1/2015 | Aguilera et al. | |
| 10,261,719 B2 | 4/2019 | Liu et al. | |
| 10,452,503 B2 | 10/2019 | Abouelwafa et al. | |
| 10,467,246 B2 | 11/2019 | Bhagat et al. | |
| 11,681,566 B2 | 6/2023 | Karnawat et al. | |
| 11,720,274 B2 | 8/2023 | Abouelwafa et al. | |
| 2016/0210196 A1 | 7/2016 | Mam et al. | |
| 2017/0364285 A1* | 12/2017 | Piduri | G06F 3/0619 |
| 2019/0121709 A1 | 4/2019 | Abouelwafa et al. | |
| 2020/0225849 A1* | 7/2020 | Meiri | H04L 67/1097 |

(Continued)

OTHER PUBLICATIONS

Hewlett Packard Enterprise Development LP, "HPE 3PAR StoreServ Architecture," Jul. 2017, Rev. 9, 4AA3-3516ENW, 39 pages.

(Continued)

*Primary Examiner* — Tony Wu
(74) *Attorney, Agent, or Firm* — Trop, Pruner & Hu, P.C.

(57) ABSTRACT

Example implementations relate to computer data storage. In some examples, a controller establishes a migration link between a first storage device and a second storage device, and create a consistency group including replicating volumes and a control volume stored on the first storage device. The controller initiates, based on the consistency group, a data copy from the replicating volumes to proxy volumes on the second storage device. In response to a completion of the data copy from the replicating volumes to the proxy volumes, the controller initiates a replication of the proxy volumes to a second replication device. Further, in response to a completion of the replication of the proxy volumes, the controller transfers a copy of the control volume to the second storage device, where the transfer of the copy of the control volume completes the migration of the consistency group.

20 Claims, 8 Drawing Sheets

(56) References Cited

U.S. PATENT DOCUMENTS

2022/0374321 A1\* 11/2022 Kaushik .............. G06F 11/1466
2023/0305727 A1 9/2023 Blea et al.

OTHER PUBLICATIONS

Hewlett Packard Enterprise Development LP, "HPE 3PAR Thin Technologies," Nov. 2016, Rev. 10, 4AA3-8987ENW, 54 pages.

Hewlett Packard Enterprise Development LP; "Migrating data to HPE 3PAR"; Jun. 2021; 2 pages.

NetApp, Inc., "NetApp SnapMirror: Unified replication for the Data Fabric," retrieved Mar. 28, 2024, Solution Brief, <https://www.netapp.com/pdf.html?item=/media/8327-ds-3820.pdf>, 2 pages.

Tony Ansley, "SnapMirror configuration and best practices guide for ONTAP 9," Jan. 2024, Technical Report, TR-4015, <https://www.netapp.com/media/17229-tr4015.pdf?v=127202175503P>, 86 pages.

\* cited by examiner

Machine Readable Storage Medium 600

610
Establish a migration link between a first storage device and a second storage device, where the first storage device stores a set of replicating volumes that are replicated on a first replication device

620
Create a consistency group comprising the set of replicating volumes and a control volume stored on the first storage device, where the consistency group is a set of data elements that are migrated together

630
Initiate, based on the consistency group, a data copy from the set of replicating volumes to a set of proxy volumes on the second storage device, where the proxy volumes forward input/output (I/O) transactions to the set of replicating volumes

640
In response to a completion of the data copy from the set of replicating volumes to the set of proxy volumes, initiate a replication of the set of proxy volumes from the second storage device to a second replication device

650
In response to a completion of the replication of the set of proxy volumes from the second storage device to the second replication device, transfer a copy of the control volume from the first storage device into the second storage device, where transferring the copy of the control volume into the second storage device completes a migration of the consistency group from the first storage device to the second storage device

FIG. 6

DATA MIGRATION USING A CONSISTENCY GROUP

BACKGROUND

Computing devices may include components such as a processor, memory, caching system, and storage device. The storage device may include a hard disk drive that uses a magnetic medium to store and retrieve data blocks. Some storage systems may transfer data between different locations or devices. For example, some systems may transfer and store copies of important data for archival and recovery purposes.

BRIEF DESCRIPTION OF THE DRAWINGS

Some implementations are described with respect to the following figures.

FIG. 6 is a diagram of an example machine-readable medium storing instructions in accordance with some implementations.

Figure 1:
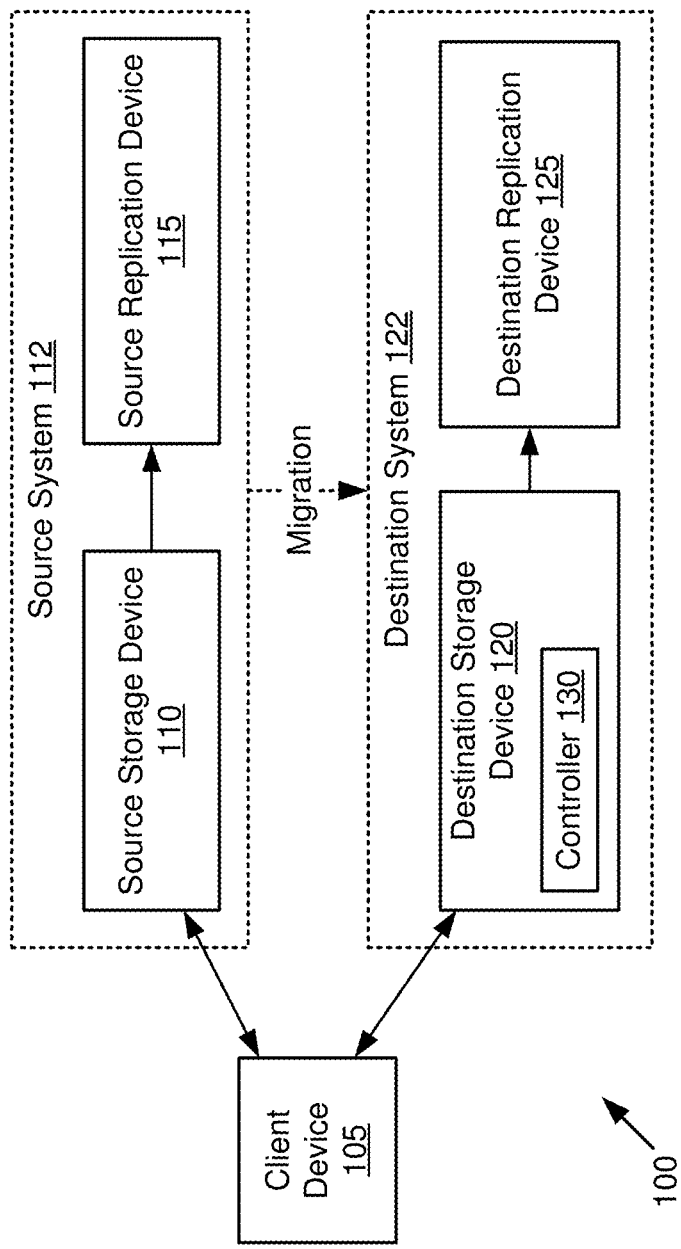
FIG. 1 is a schematic diagram of an example system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

As used herein, a "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof. As used herein, a "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a collection of input data (e.g., a stream of real-time data values) may be persistently stored on a storage system. The storage system may include two (or more) storage devices that store duplicate copies of the data. For example, the storage system may include a first storage array that stores a copy of a collection of data, and may also include a second storage array that stores a duplicate copy of the collection of data stored on the first storage array. In this manner, data that is valuable or mission-critical (e.g., banking transaction data) may be protected against loss in the event of the failure of a single device or array.

In some examples, an existing storage system may be replaced with a different storage system (e.g., a newer storage system with improved storage capacity, data throughput, data security, etc.). This replacement process may include migrating the data stored on the existing storage system to the different storage system. However, the two storage systems may not be capable of performing the data migration without interruption of the normal storage functionality. For example, the two storage systems may be provided by different vendors (or may use different product lines or device generations from a same vendor), and may lack compatible functionality to perform a data migration while also receiving new input data and maintaining full replication of the stored data. Therefore, in such examples, performing the data migration may involve interrupting the receipt of new input data, and/or not maintaining full replication of the stored data during the entire period of the data migration. Accordingly, in such examples, performing the data migration may negatively impact the reliability and performance of one or both of the storage systems.

In accordance with some implementations of the present disclosure, a controller may perform a migration process to replace an existing ("source") storage system with a different ("destination") storage system. The source storage system and the destination storage system may each include a primary storage device and a secondary replication device. In some implementations, the migration process may include defining a consistency group that includes all replicated volumes on the source storage device (i.e., the volumes that are replicated to the source replication device), and also includes a dummy control volume that has no data content. The migration process may also include transferring the replicated volumes from the source storage device to the destination storage device, and initiating a data replication from the destination storage device to the destination replication device. Further, after completing the data replication, the migration process may include transferring the control volume from the source storage device to the destination storage device, thereby completing the migration of the consistency group. In this manner, the migration process may be completed while maintaining data storage and replication. Various aspects of the disclosed migration process are discussed further below with reference to FIGS. 1-6.

FIG. 1—Example System

FIG. 1 shows an example system 100, in accordance with some implementations. The system 100 may include a client device 105, a source system 112, and a destination system 122. The source system 112 may include a source storage device 110 and a source replication device 115. In some implementations, the source storage device 110 may receive data from the client device 105, and may persistently store the received data. Further, some or all of the data stored on the source storage device 110 may be copied or "replicated" to be persistently stored on the source replication device 115. For example, the source storage device 110 may store data in a set of volumes (e.g., logical storage units) that are automatically replicated to the source replication device 115 (also referred to herein as "replicated volumes"). In this manner, the data received from the client device 105 may be persistently stored in two different storage devices 110, 115, and may thus be protected against loss due to the failure of one of the two storage devices 110, 115.

In some implementations, the source system 112 may be replaced by the destination system 122 that includes a destination storage device 120 and a destination replication device 125. For example, the owner or manager of the system 100 may determine that the source system 112 is an older storage system that does not meet a set of requirements (e.g., based on storage capacity, data throughput, data security, etc.), and may therefore replace the source system 112 with the newer destination system 122 that is capable of satisfying the set of requirements. In some examples, the source system 112 and the destination system 122 may be provided by different vendors, or may use different product lines or device generations from a same vendor.

In some implementations, the process of replacing the source system 112 with the destination system 122 (also referred to herein as a "migration process") may include copying the data stored on the source system 112 to the destination system 122. Further, after completing the migration process, the destination storage device 120 may receive input data from the client device 105, and may persistently store the received data. Further, the data stored on the destination storage device 120 may be replicated to the destination replication device 125.

In some implementations, some or all of the devices 110, 115, 120, 125 may be implemented using persistent (e.g., nonvolatile) storage device(s), such as disk-based storage device(s) (e.g., hard disk drive(s) (HDDs)), solid state device(s) (SSDs) such as flash storage device(s), and the like. For example, the devices 110, 115, 120, 125 may be different storage arrays that each include multiple storage components (e.g., HDDs, SSDs, etc.).

In some implementations, the destination storage device 120 may include a controller 130 to manage storage operations. The controller 130 may be implemented via hardware (e.g., electronic circuitry) or a combination of hardware and programming (e.g., comprising at least one processor and instructions executable by the at least one processor and stored on at least one machine-readable storage medium).

In some implementations, the controller 130 may include functionality to manage a migration process to replace the source system 112 with the destination system 122. The controller 130 may initiate the migration process in response to the receipt of a command or message (e.g., a request from a human user to perform the migration process). In some implementations, the migration process may include defining a consistency group that includes all replicated volumes on the source storage device 110 (i.e., the volumes that are replicated to the source replication device 115), and also includes a dummy control volume that has no data content. The migration process may also include transferring the replicated volumes from the source storage device 110 to the destination storage device 120, and then initiating a data replication from the destination storage device 120 to the destination replication device 125. Further, after completing the data replication, the migration process may include transferring the control volume from the source storage device 110 to the destination storage device 120, thereby completing the migration of the consistency group. In this manner, the migration process may be completed while maintaining data storage and replication. An example migration process is described in greater detail below with reference to FIGS. 2-3F.

Figure 2:
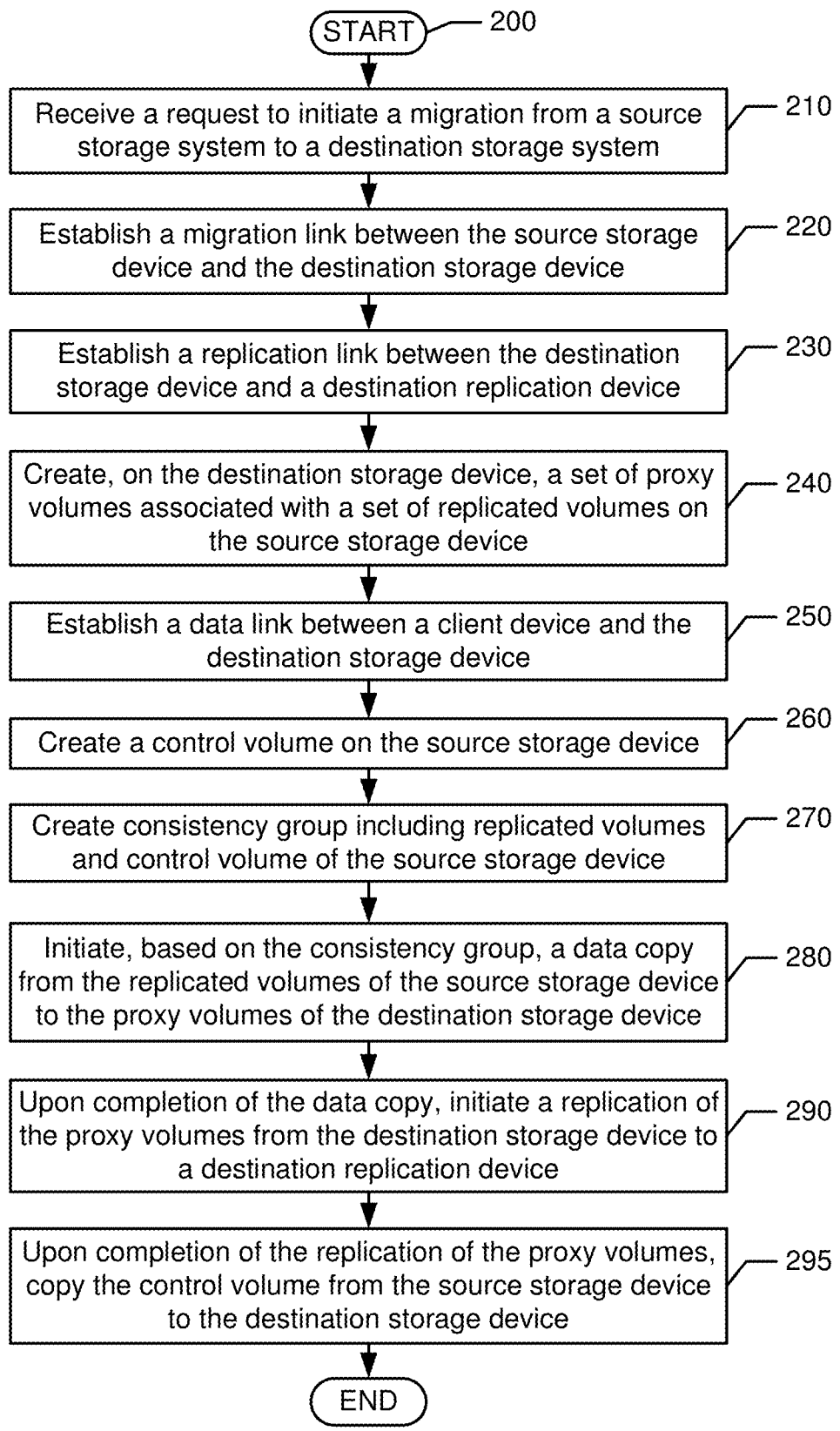
FIG. 2 is an illustration of an example process, in accordance with some implementations.
Figure 3A:
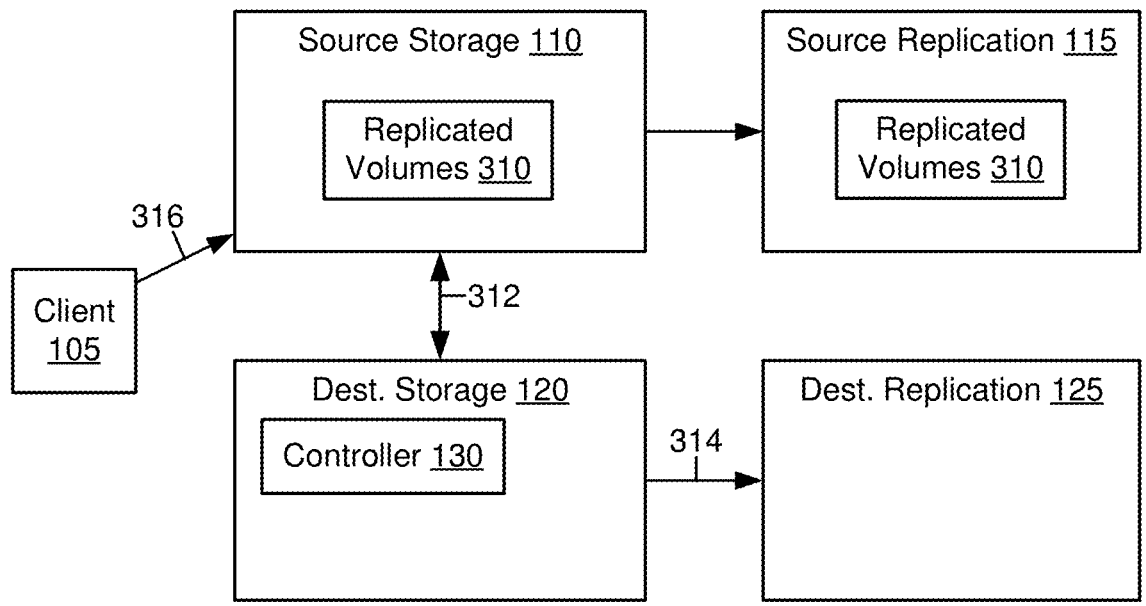
FIGS. 3A-3F are illustration of example operations, in accordance with some implementations.
Figure 3B:
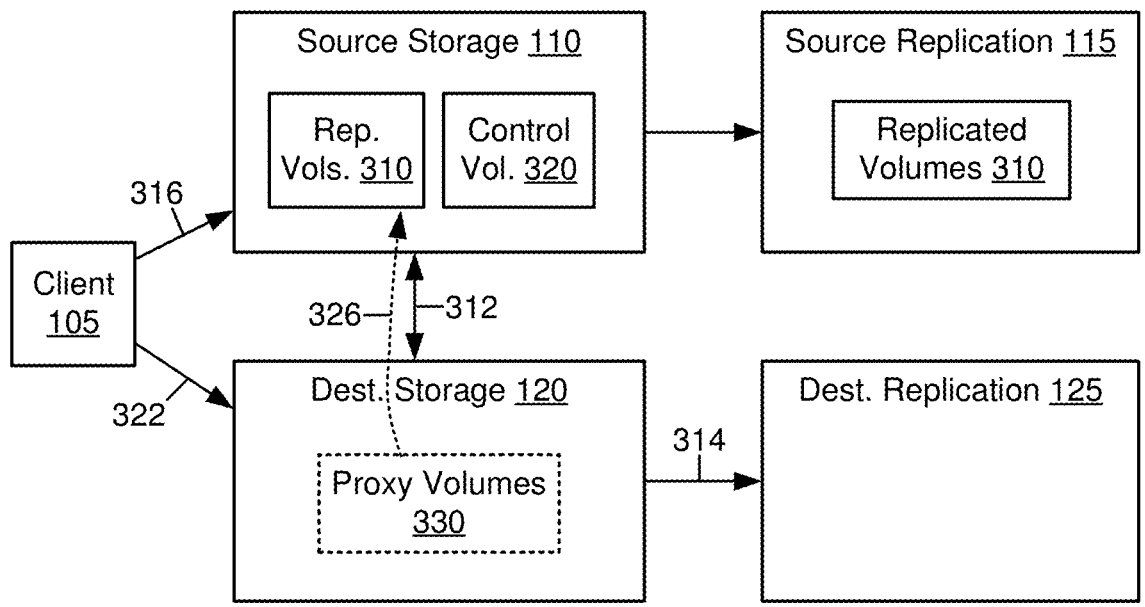
Figure 3C:
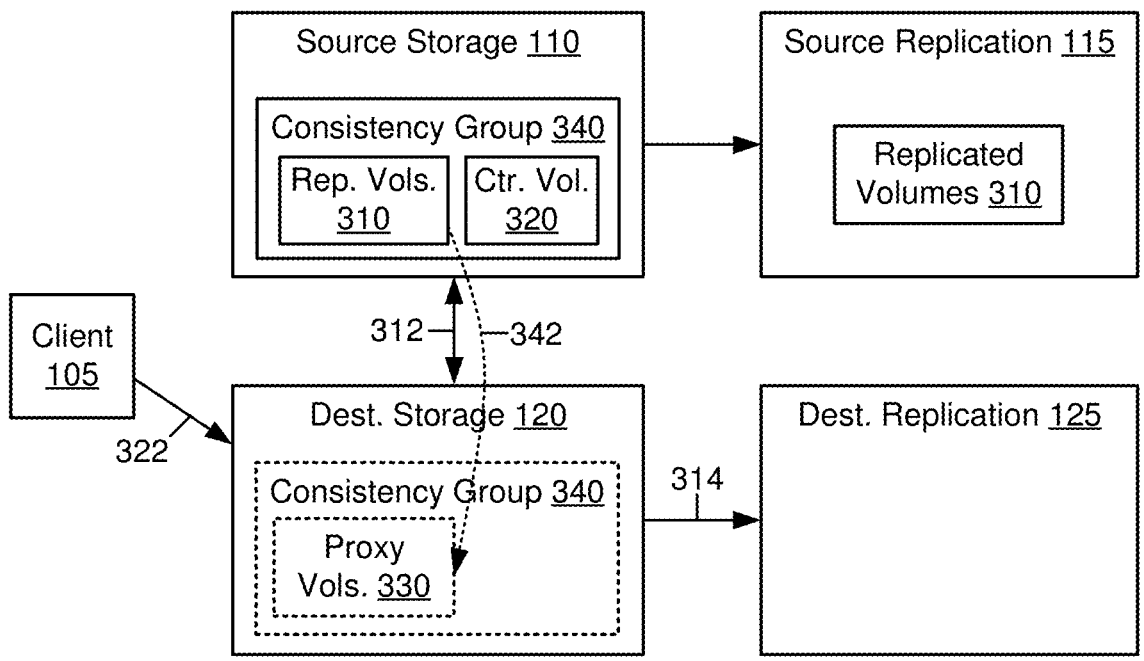
Figure 3D:
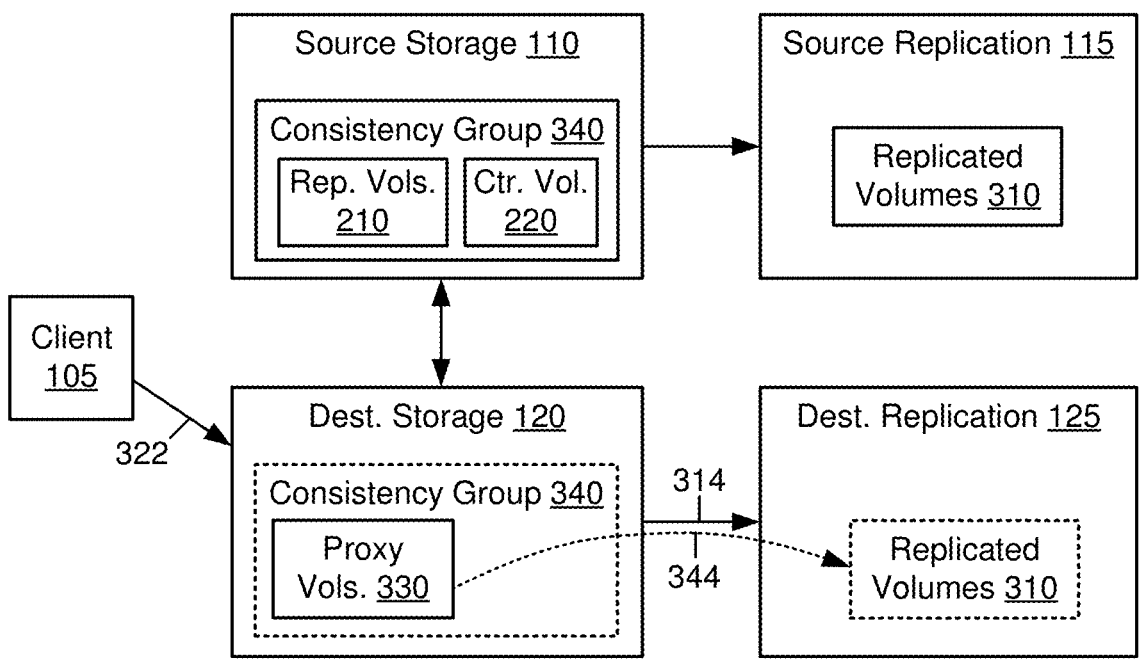
Figure 3E:
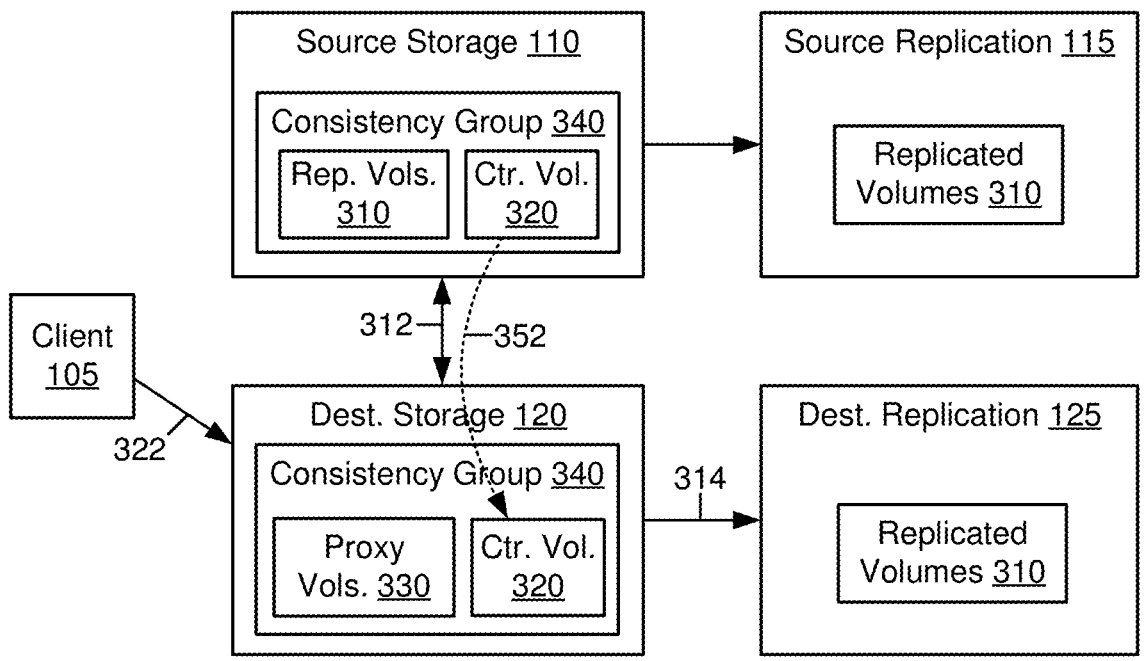
Figure 3F:
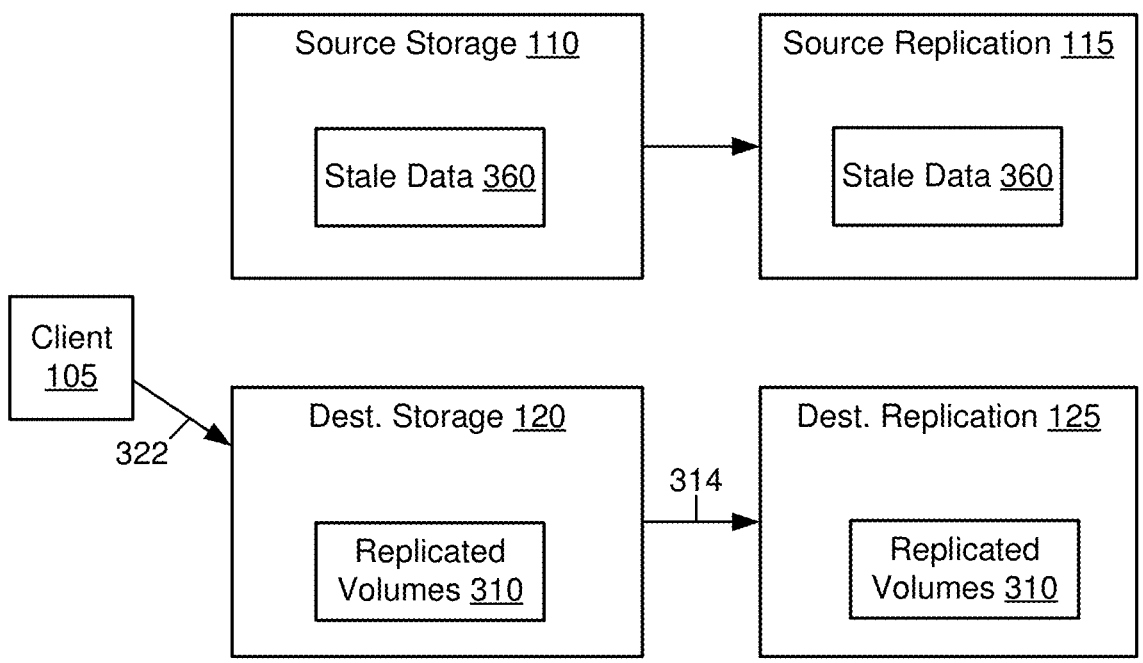

FIGS. 2-3F—Example Migration Process

FIG. 2 shows an example migration process 200, in accordance with some implementations. The process 200 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 200 may be described below with reference to FIGS. 1 and 3A-3F, which show example implementations. However, other implementations are also possible.

Block 210 may include receiving a request to initiate a migration from a source storage system to a destination storage system. Block 220 may include establishing a migration link between the source storage device and the destination storage device. Block 230 may include establishing a replication link between the destination storage device and a destination replication device. For example, referring to FIG. 3A, the source storage device 110 receives data inputs/outputs (I/Os) from the client device 105 via a data link 316. Further, the source storage device 110 stores data in replicated volumes 310 that are automatically copied to the source replication device 115. Subsequently, the controller 130 receives a request (e.g., a user command, program instruction, etc.) to initiate a migration from the source system 112 to the destination system 122. In response to the request, the controller 130 establishes a migration link 312 between the source storage device 110 and the destination storage device 120. Further, the controller 130 establishes a replication link 314 between the destination storage device 120 and the destination replication device 125.

Referring again to FIG. 2, block 240 may include creating, on the destination storage device, a set of proxy volumes associated with a set of replicated volumes on the source storage device. For example, referring to FIG. 3B, the controller initiates or registers the proxy volumes 330 on the destination storage device 120 (also referred to as "admitting" the proxy volumes 330 on destination storage device 120). Each proxy volume 330 represents (or is otherwise associated with) a different replicated volume 310 on the source storage device 110. When each proxy volume 330 is registered or admitted on the destination storage device 120, that proxy volume 330 is viewed by the client device 105 as representing a corresponding replicated volume 310.

Referring again to FIG. 2, block 250 may include establish a data link between a client device and the destination storage device. For example, referring to FIG. 3B, the controller establishes a data link 322 between the client device 105 and the destination storage device 120. Further, the client device 105 sends data I/Os to the proxy volumes 330 via the data link 322, and the proxy volumes 330 forward these data I/Os (represented by dotted arrow 326) to the corresponding replicated volumes 310 (e.g., via the migration link 312).

Referring again to FIG. 2, block 260 may include creating a control volume on the source storage device. For example, referring to FIG. 3B, the controller creates the control volume 320 on the source storage device 110. In some implementations, the control volume 320 is a dummy volume that does not include any data, and is used to control the progression of the migration from the source system 112 to the destination system 122.

Referring again to FIG. 2, block 270 may include creating a consistency group including the replicated volumes and the control volume of the source storage device. For example, referring to FIG. 3C, the controller creates the consistency group 340 that includes the replicated volumes 310 and the control volume 320 (on source storage device 110). As used herein, the term "consistency group" refers to a specified set of data elements (e.g., volumes, files, etc.) that are migrated together (e.g., during a single migration operation). In some implementations, creating the consistency group 340 initiates or defines a grouped migration that is not completed until all data elements in the consistency group 340 (i.e., both the replicated volumes 310 and the control volume 320) are fully migrated to the destination storage device 120. Further, the controller removes the data link 316 between client device 105 and source storage device 110.

Referring again to FIG. 2, block 280 may include initiating, based on the consistency group, a data copy from the replicated volumes of the source storage device to the proxy volumes of the destination storage device. For example, referring to FIG. 3C, the controller initiates a data copy 342 (e.g., via the migration link 312) from the replicated volumes 310 to the proxy volumes 330. The data copy 342 may be performed based on (or in accordance with) the consistency group 340. For example, in some implementations, the data copy 342 transfers a copy of a first portion (i.e., the replicated volumes 310) of the consistency group 340 into the destination storage device 120, but does not transfer a copy of a second portion (i.e., the control volume 320) of the consistency group 340 into the destination storage device 120. As such, the consistency group 340 is not fully migrated upon completing the data copy 342 (i.e., by only copying the data of the replicated volumes 310 to the destination storage device 120).

In some implementations, while the data copy 342 is being performed, the storage systems 112, 122 may continue to perform migration operations. For example, the proxy volumes 330 may continue to forward the data I/Os to the replicated volumes 310 on the source storage device 110, and the replicated volumes 310 on the source storage device 110 may continue to be replicated to the replicated storage device 115.

Referring again to FIG. 2, block 290 may include, upon completion of the data copy, initiate a replication of the proxy volumes from the destination storage device to a destination replication device. For example, referring to FIG. 3D, the controller determines that the data copy 342 has been completed, and in response initiates a data replication 344 (e.g., via the replication link 314) of the proxy volumes 330 from the destination storage device 120 to the destination replication device 125. The data replication 344 may generate the replicated volumes 310 on the destination replication device 125.

In some implementations, while the data replication 344 is being performed, the storage systems 112, 122 may continue to perform migration operations. For example, the proxy volumes 330 may continue to forward the data I/Os to the replicated volumes 310 on the source storage device 110, and the replicated volumes 310 on the source storage device 110 may continue to be replicated to the replicated storage device 115.

Referring again to FIG. 2, block 295 may include, upon completion of the replication of the proxy volumes, copy the control volume from the source storage device to the destination storage device. After block 295, the process 200 may be completed. For example, referring to FIG. 3E, the controller 130 determines that the data replication 344 has been completed, and in response perform a data copy 352 (e.g., via the migration link 314) to copy the control volume 320 from the source storage device 110 into the destination storage device 120.

In some implementations, copying the control volume 320 into the destination storage device 120 completes the migration of the consistency group 340 (including the replicated volumes 310 and the control volume 320). Further, upon completing the migration of the consistency group 340, one or more actions may be performed to complete the switch-over from the source system 112 to the destination system 122. For example, referring to FIG. 3F, the controller 130 deletes the consistency group 340, deletes the copies of the control volume 320 (in the source storage device 110 and the destination storage device 120), and also removes the migration link 312. Further, the controller 130 converts the proxy volumes 330 into replicated volumes 310 on the destination storage device 120. After converting the proxy volumes 330 into the replicated volumes 310 on the destination storage device 120, these replicated volumes 310 no longer forward the data I/Os to the replicated volumes 310 on the source storage device 110. Rather, the data I/Os are only applied to the replicated volumes 310 on the destination storage device 120, and are replicated on the destination replication device 125. Subsequently, the storage system 112 is no longer updated with new data and may thus store stale data 360 (e.g., an older copy of the replicated volumes 310), or may be taken offline.

Figure 4:
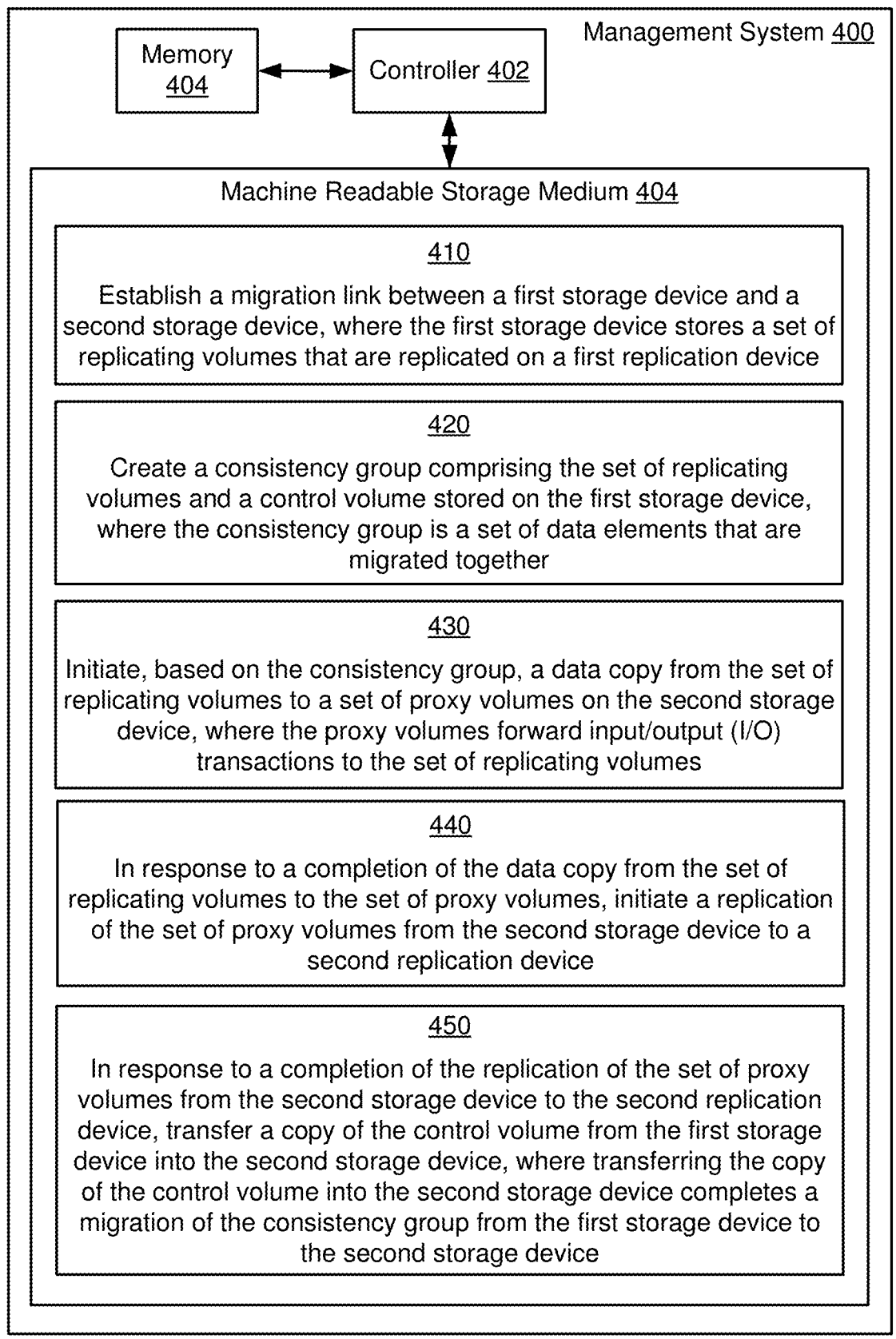
FIG. 4 is a schematic diagram of an example management system, in accordance with some implementations.

FIG. 4—Example Management System

FIG. 4 shows a schematic diagram of an example management system 400. In some examples, the management system 400 may correspond generally to some or all of the controller 130 (shown in FIG. 1). As shown, the management system 400 may include a controller 402 and machine-readable storage 405 including instructions 410-450. The machine-readable storage 405 may be a non-transitory medium. The instructions 410-450 may be executed by the controller 402, or by a processing engine included in the controller 402.

Instruction 410 may be executed to establish a migration link between a first storage device and a second storage device, where the first storage device stores a set of replicating volumes that are replicated on a first replication device. For example, referring to FIG. 3A, the source storage device 110 receives data inputs/outputs (I/Os) from the client device 105, and stores data in replicated volumes 310 that are automatically copied to the source replication device 115. The controller 130 receives a request to initiate a migration, and in response establishes a migration link 312 between the source storage device 110 and the destination storage device 120. In some implementations, the controller 130 establishes a replication link 314 between the destination storage device 120 and the destination replication device 125, and admits the proxy volumes 330 on the destination storage device 120. Further, referring to FIG. 3B, the controller 130 admits the proxy volumes 330 on the destination storage device 120, establishes a data link 322 between the client device 105 and the destination storage device 120, and creates the control volume 320 on the source storage device 110.

Instruction 420 may be executed to create a consistency group comprising the set of replicating volumes and a control volume stored on the first storage device, where the consistency group is a set of data elements that are migrated together. For example, referring to FIG. 3C, the controller creates the consistency group 340 that includes the replicated volumes 310 and the control volume 320 stored on source storage device 110). Further, the controller removes the data link 316 between client device 105 and source storage device 110.

Instruction 430 may be executed to initiate, based on the consistency group, a data copy from the set of replicating volumes to a set of proxy volumes on the second storage device, where the proxy volumes forward input/output (I/O) transactions to the set of replicating volumes. For example, referring to FIG. 3B, the client device 105 sends data I/Os to the proxy volumes 330 via the data link 322. The proxy volumes 330 forward the received data I/Os (represented by dotted arrow 326) to the corresponding replicated volumes 310 (e.g., via the migration link 312). Further, referring to FIG. 3C, the controller initiates a data copy 342 (e.g., via the migration link 312) from the replicated volumes 310 to the proxy volumes 330. The data copy 342 is performed based on the consistency group 340.

Instruction 440 may be executed to, in response to a completion of the data copy from the set of replicating volumes to the set of proxy volumes, initiate a replication of the set of proxy volumes from the second storage device to a second replication device. For example, referring to FIG. 3D, the controller determines that the data copy 342 has been completed, and in response initiates a data replication 344 (e.g., via the replication link 314) of the proxy volumes 330 from the destination storage device 120 to the destination replication device 125. The data replication 344 stores the replicated volumes 310 on the destination replication device 125.

Instruction 450 may be executed to, in response to a completion of the replication of the set of proxy volumes from the second storage device to the second replication device, transfer a copy of the control volume from the first storage device into the second storage device, where transferring the copy of the control volume into the second storage device completes a migration of the consistency group from the first storage device to the second storage device. For example, referring to FIG. 3E, the controller determines that the data replication 344 has been completed, and in response perform a data copy 352 (e.g., via the migration link 314) to copy the control volume 320 from the source storage device 110 into the destination storage device 120. In some implementations, copying the control volume 320 into the destination storage device 120 completes the migration of the consistency group 340 (including the replicated volumes 310 and the control volume 320).

In some implementations, after (or as part of) a completion of the migration of the consistency group 340, one or more actions may be performed to complete the switch-over from the source system 112 to the destination system 122. For example, referring to FIG. 3F, the controller deletes the consistency group 340, deletes the copies of the control volume 320 (in the source storage device 110 and the destination storage device 120), and also removes the migration link 312. Further, the controller 130 converts the proxy volumes 330 into replicated volumes 310 on the destination storage device 120.

Figure 5:
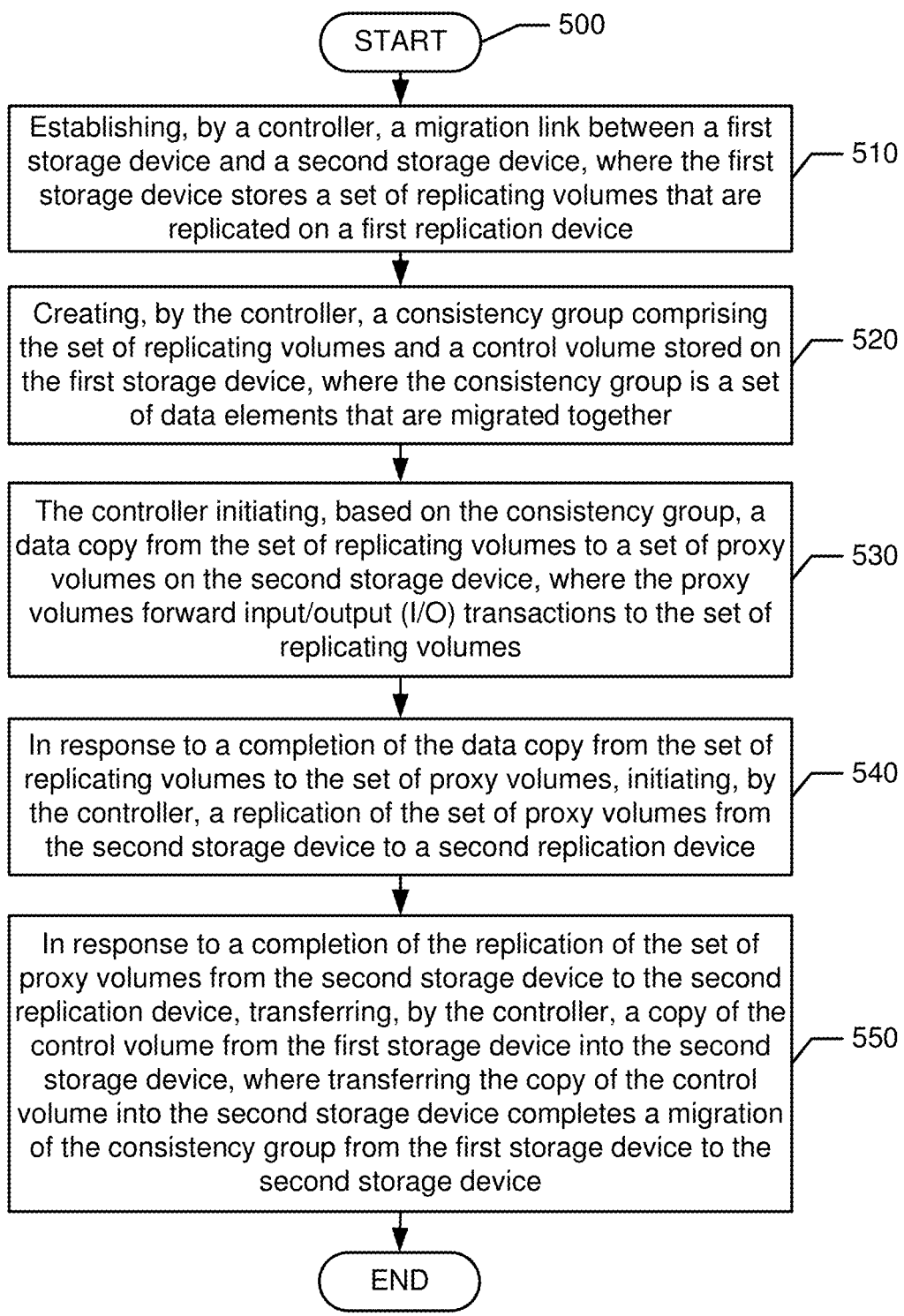
FIG. 5 is an illustration of an example process, in accordance with some implementations.

FIG. 5—Example Process

FIG. 5 shows an example process 500, in accordance with some implementations. In some examples, the process 500 may be performed by a processor or controller (e.g., the controller 130 shown in FIG. 1). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. However, other implementations are also possible.

Block 510 may include establishing, by a controller, a migration link between a first storage device and a second storage device, where the first storage device stores a set of replicating volumes that are replicated on a first replication device. Block 520 may include creating, by the controller, a consistency group comprising the set of replicating volumes and a control volume stored on the first storage device, where the consistency group is a set of data elements that are migrated together.

Block 530 may include the controller initiating, based on the consistency group, a data copy from the set of replicating volumes to a set of proxy volumes on the second storage device, where the proxy volumes forward input/output (I/O) transactions to the set of replicating volumes. Block 540 may include, in response to a completion of the data copy from the set of replicating volumes to the set of proxy volumes, initiating, by the controller, a replication of the set of proxy volumes from the second storage device to a second replication device.

Block 550 may include, in response to a completion of the replication of the set of proxy volumes from the second storage device to the second replication device, transferring, by the controller, a copy of the control volume from the first storage device into the second storage device, where transferring the copy of the control volume into the second storage device completes a migration of the consistency group from the first storage device to the second storage device. Blocks 510-550 may correspond generally to the examples described above with reference to instructions 410-450 (shown in FIG. 4).

FIG. 6—Example Machine-Readable Medium

FIG. 6 shows a machine-readable medium 600 storing instructions 610-650, in accordance with some implementations. The instructions 610-650 can be executed by a controller (e.g., controller 130 shown in FIG. 1), such as a single processor, multiple processors, a single processing engine, multiple processing engines, and so forth. The machine-readable medium 600 may be a non-transitory storage medium, such as an optical, semiconductor, or magnetic storage medium. The instructions 610-650 may correspond generally to the examples described above with reference to instructions 410-450 (shown in FIG. 4).

Instruction 610 may be executed to establish a migration link between a first storage device and a second storage device, where the first storage device stores a set of replicating volumes that are replicated on a first replication device. Instruction 620 may be executed to create a consistency group comprising the set of replicating volumes and a control volume stored on the first storage device, where the consistency group is a set of data elements that are migrated together. Instruction 630 may be executed to initiate, based on the consistency group, a data copy from the set of replicating volumes to a set of proxy volumes on the second storage device, where the proxy volumes forward input/output (I/O) transactions to the set of replicating volumes.

Instruction 640 may be executed to, in response to a completion of the data copy from the set of replicating volumes to the set of proxy volumes, initiate a replication of the set of proxy volumes from the second storage device to a second replication device. Instruction 650 may be executed to, in response to a completion of the replication of the set of proxy volumes from the second storage device to the second replication device, transfer a copy of the control volume from the first storage device into the second storage device, where transferring the copy of the control volume into the second storage device completes a migration of the consistency group from the first storage device to the second storage device.

CONCLUSION

In accordance with some implementations described herein, a controller may perform a migration process to replace a source storage system with destination storage system. The source storage system and the destination storage system may each include a primary storage device and a secondary replication device. In some implementations, the migration process may include defining a consistency group that includes all replicated volumes on the source storage device, and also includes a dummy control volume that has no data content. The migration process may also include transferring the replicated volumes from the source storage device to the destination storage device, and initiating a data replication from the destination storage device to the destination replication device. Further, after completing the data replication, the migration process may include transferring the control volume from the source storage device to the destination storage device, thereby completing the migration of the consistency group. In this manner, the migration process may be completed while maintaining data storage and replication.

Note that, while FIGS. 1-6 show various examples, implementations are not limited in this regard. For example, referring to FIG. 1, it is contemplated that the system 100 may include additional devices and/or components, fewer components, different components, different arrangements, and so forth. In another example, it is contemplated that each of the devices 110, 115, 125 may also include controllers to manage the operation of the respective device 110, 115, 125. In yet another example, it is contemplated that the functionality of the system 100 described above may be included in any another engine or software. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

In the present disclosure, use of the term "a," "an," or "the" is intended to include the plural forms as well, unless the context clearly indicates otherwise. Also, the term "includes," "including" "comprises," "comprising" "have," or "having" when used in this disclosure specifies the presence of the stated elements, but do not preclude the presence or addition of other elements.

What is claimed is:

1. A management system comprising:
    a controller; and
    a machine-readable storage storing instructions, the instructions executable by the processor to:
        establish a migration link between a first storage device and a second storage device, wherein the first storage device stores a set of replicating volumes that are replicated on a first replication device;
        create a consistency group comprising the set of replicating volumes and a control volume stored on the first storage device, wherein the consistency group is a set of data elements that are migrated together;
        initiate, based on the consistency group, a data copy from the set of replicating volumes to a set of proxy volumes on the second storage device, wherein the proxy volumes forward input/output (I/O) transactions to the set of replicating volumes;
        in response to a completion of the data copy from the set of replicating volumes to the set of proxy volumes, initiate a replication of the set of proxy volumes from the second storage device to a second replication device; and
        in response to a completion of the replication of the set of proxy volumes from the second storage device to the second replication device, transfer a copy of the control volume from the first storage device into the second storage device, wherein transferring the copy of the control volume into the second storage device completes a migration of the consistency group from the first storage device to the second storage device.

2. The management system of claim 1, including instructions executable by the controller to:
    create the control volume as an empty volume included in the first storage device.

3. The management system of claim 1, including instructions executable by the controller to:
after completing the migration of the consistency group, convert the set of proxy volumes into a second set of replicating volumes that are replicated on the second replication device.

4. The management system of claim 1, including instructions executable by the controller to:
after completing the migration of the consistency group:
delete the consistency group;
delete the control volume stored on the first storage device; and
delete the control volume stored on the second storage device.

5. The management system of claim 1, including instructions executable by the controller to:
perform the data copy using the migration link between the first storage device and the second storage device; and
after completing the migration of the consistency group, remove the migration link between the first storage device and the second storage device.

6. The management system of claim 1, including instructions executable by the controller to:
establish a first data link between a client device and the second storage device;
receive, from the client device, the I/O transactions via the first data link; and
remove a second data link between the client device and the first storage device.

7. The management system of claim 1, wherein the control volume is not replicated on the first replication device.

8. The management system of claim 1, wherein the first storage device and the first replication device use a first storage technology, and wherein the second storage device and the second replication device use a second storage technology that is different from the first storage technology.

9. The management system of claim 1, wherein the controller is included in one of the second storage device and a system management device.

10. The method of claim 1, wherein the controller is included in one of the second storage device and a system management device.

11. A method comprising:
establishing, by a controller, a migration link between a first storage device and a second storage device, wherein the first storage device stores a set of replicating volumes that are replicated on a first replication device;
creating, by the controller, a consistency group comprising the set of replicating volumes and a control volume stored on the first storage device, wherein the consistency group is a set of data elements that are migrated together;
the controller initiating, based on the consistency group, a data copy from the set of replicating volumes to a set of proxy volumes on the second storage device, wherein the proxy volumes forward input/output (I/O) transactions to the set of replicating volumes;
in response to a completion of the data copy from the set of replicating volumes to the set of proxy volumes, initiating, by the controller, a replication of the set of proxy volumes from the second storage device to a second replication device; and
in response to a completion of the replication of the set of proxy volumes from the second storage device to the second replication device, transferring, by the controller, a copy of the control volume from the first storage device into the second storage device, wherein transferring the copy of the control volume into the second storage device completes a migration of the consistency group from the first storage device to the second storage device.

12. The method of claim 11, comprising:
establishing a first data link between a client device and the second storage device;
receiving, from the client device, the I/O transactions via the first data link;
creating the control volume as an empty volume included in the first storage device; and
removing a second data link between the client device and the first storage device.

13. The method of claim 11, comprising, after completing the migration of the consistency group:
removing the migration link between the first storage device and the second storage device; and
converting the set of proxy volumes into a second set of replicating volumes that are replicated on the second replication device.

14. The method of claim 11, wherein the first storage device and the first replication device use a first storage technology, and wherein the second storage device and the second replication device use a second storage technology that is different from the first storage technology.

15. The method of claim 13, comprising, after completing the migration of the consistency group:
deleting the consistency group;
deleting the control volume stored on the first storage device; and
deleting the control volume stored on the second storage device.

16. A non-transitory machine-readable medium storing instructions that upon execution cause a controller to:
establish a migration link between a first storage device and a second storage device, wherein the first storage device stores a set of replicating volumes that are replicated on a first replication device;
create a consistency group comprising the set of replicating volumes and a control volume stored on the first storage device, wherein the consistency group is a set of data elements that are migrated together;
initiate, based on the consistency group, a data copy from the set of replicating volumes to a set of proxy volumes on the second storage device, wherein the proxy volumes forward input/output (I/O) transactions to the set of replicating volumes;
in response to a completion of the data copy from the set of replicating volumes to the set of proxy volumes, initiate a replication of the set of proxy volumes from the second storage device to a second replication device; and
in response to a completion of the replication of the set of proxy volumes from the second storage device to the second replication device, transfer a copy of the control volume from the first storage device into the second storage device, wherein transferring the copy of the control volume into the second storage device completes a migration of the consistency group from the first storage device to the second storage device.

17. The non-transitory machine-readable medium of claim 16, including instructions that upon execution cause the controller to:

establish a first data link between a client device and the second storage device;

receive, from the client device, the I/O transactions via the first data link;

create the control volume as an empty volume included in the first storage device; and remove a second data link between the client device and the first storage device.

18. The non-transitory machine-readable medium of claim 16, including instructions that upon execution cause the controller to:

after completing the migration of the consistency group:
  remove the migration link between the first storage device and the second storage device; and
  convert the set of proxy volumes into a second set of replicating volumes that are replicated on the second replication device.

19. The non-transitory machine-readable medium of claim 16, including instructions that upon execution cause the controller to:

after completing the migration of the consistency group:
  delete the consistency group;
  delete the control volume stored on the first storage device; and
  delete the control volume stored on the second storage device.

20. The non-transitory machine-readable medium of claim 16, wherein the first storage device and the first replication device use a first storage technology, and wherein the second storage device and the second replication device use a second storage technology that is different from the first storage technology.

* * * * *